United States Patent
Kuramochi et al.

(10) Patent No.: US 11,548,029 B2
(45) Date of Patent: Jan. 10, 2023

(54) MULTILAYER COATING FILM FORMING METHOD

(71) Applicant: KANSAI PAINT CO., LTD., Hyogo (JP)

(72) Inventors: Tatsuo Kuramochi, Kanagawa (JP); Hirokazu Okazaki, Kanagawa (JP); Nobuhiko Narita, Kanagawa (JP); Ryuji Nonaka, Kanagawa (JP); Keiichi Okamoto, Kanagawa (JP); Kouji Teramoto, Kanagawa (JP); Takakazu Yamane, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 16/650,495

(22) PCT Filed: Sep. 28, 2018

(86) PCT No.: PCT/JP2018/036243
§ 371 (c)(1),
(2) Date: Mar. 25, 2020

(87) PCT Pub. No.: WO2019/065961
PCT Pub. Date: Apr. 4, 2019

(65) Prior Publication Data
US 2020/0306794 A1    Oct. 1, 2020

(30) Foreign Application Priority Data
Sep. 29, 2017  (JP) .............................. JP2017-191055

(51) Int. Cl.
| | | |
|---|---|---|
| *B05D 5/06* | (2006.01) |
| *C09D 7/40* | (2018.01) |
| *C09D 7/62* | (2018.01) |
| *B05D 1/36* | (2006.01) |
| *B05D 3/02* | (2006.01) |
| *B05D 7/00* | (2006.01) |
| *C09D 5/00* | (2006.01) |
| *C09D 5/29* | (2006.01) |
| *C09D 133/06* | (2006.01) |
| *C09D 175/04* | (2006.01) |

(52) U.S. Cl.
CPC ............... *B05D 5/067* (2013.01); *B05D 1/36* (2013.01); *B05D 3/0254* (2013.01); *B05D 7/572* (2013.01); *C09D 5/002* (2013.01); *C09D 5/29* (2013.01); *C09D 7/62* (2018.01); *C09D 7/70* (2018.01); *C09D 133/066* (2013.01); *C09D 175/04* (2013.01)

(58) Field of Classification Search
None
See application file for complete search history.

(56) References Cited

U.S. PATENT DOCUMENTS

| | | | |
|---|---|---|---|
| 2007/0071901 A1 | 3/2007 | Avgenaki et al. | |
| 2010/0272986 A1* | 10/2010 | Dutt | B05D 7/572 |
| | | | 428/323 |
| 2012/0295032 A1 | 11/2012 | Shimizu et al. | |
| 2016/0256893 A1* | 9/2016 | Kato | B05D 5/065 |

FOREIGN PATENT DOCUMENTS

| | | |
|---|---|---|
| CN | 102695764 | 9/2012 |
| JP | 6-182294 | 7/1994 |
| JP | 6-254484 | 9/1994 |
| JP | 2008-23454 | 2/2008 |
| JP | 2009-509752 | 3/2009 |
| JP | 2012-157827 | 8/2012 |
| JP | 2014-004552 | 1/2014 |
| JP | 2014004552 A * | 1/2014 |
| JP | 2016-77998 | 5/2016 |

OTHER PUBLICATIONS

Machine Translation of JP 2014-004552 A (Year: 2014).*
International Search Report dated Dec. 11, 2018 in International (PCT) Application No. PCT/JP2018/036243.
Mukhtar Ahmad, "Coloring of Plastics: Theory and Practice", China Light Industry Press, 1984, pp. 67-68, with English translation.

* cited by examiner

*Primary Examiner* — Shamim Ahmed
*Assistant Examiner* — Bradford M Gates
(74) *Attorney, Agent, or Firm* — Wenderoth, Lind & Ponack, L.L.P.

(57) ABSTRACT

Provided is a method for forming a multilayer coating film including the following steps (1) to (4): (1) applying a base paint (X) to a substrate to form a base coating film; (2) applying a specific effect pigment dispersion (Y) to the base coating film formed in step (1) to form an effect coating film with a specific dry film thickness; (3) applying a clear paint (Z) to the effect coating film formed in step (2) to form a clear coating film; and (4) heating the uncured base coating film, the uncured effect coating film, and the uncured clear coating film formed in steps (1) to (3) to simultaneously cure these three coating films.

9 Claims, No Drawings

MULTILAYER COATING FILM FORMING METHOD

TECHNICAL FIELD

The present invention relates to a method for forming a multilayer coating film.

BACKGROUND ART

The main purpose of applying paint is to protect materials, and to impart an excellent appearance to materials. In industrial commodities, great value is placed on excellent appearance, in particular "texture," to enhance product appeal.

Although the texture of industrial commodities desired by consumers varies, metallic or pearlescent luster has been in demand in fields such as automobile exterior panels, auto parts, and home appliances ("metallic luster" below).

Metallic luster refers to a texture that has no surficial graininess, like the surface of a mirror; and that shines brilliantly when viewed in a direction practically perpendicular to a painted plate (highlight). In particular, a texture called "white metallic luster" is demanded. White metallic luster refers to a texture of metallic luster that has a high lightness in the highlight region and that has a lower lightness in a region (bottom) when a coating film is viewed in an oblique direction, than in the highlight region; while also exhibiting perceivable whiteness.

PTL 1 discloses a method for forming a metallic coating film that includes applying a metallic paint containing a flake-effect aluminum powder and a titanium oxide powder with a particle size (diameter) of 0.01 to 0.08 μm, and subsequently applying a clear paint. PTL 2 discloses a pearlescent film structure formed such that a color-base coating layer containing a pigment component that is a mixture of an aluminum powder pigment with an average particle size of 10 to 25 μm and a titanium oxide pigment in a specific ratio, with the amount of the aluminum powder pigment being 2 to 15 PHR, is formed on a substrate; and a clear coating layer is stacked on the color-base coating layer.

However, the methods for forming a metallic coating film disclosed in PTL 1 and PTL 2 may result in poor white metallic luster due to low lightness in the highlight, and insufficient water resistance and adhesion.

CITATION LIST

Patent Literature

PTL 1: JPH06-254484A
PTL 2: JPH06-182294A

SUMMARY OF INVENTION

Technical Problem

An object of the present invention is to provide a method for forming a multilayer coating film that exhibits a high lightness overall from the highlight to the bottom, particularly being capable of imparting white metallic luster; and that is excellent in adhesion and water resistance.

Solution to Problem

Specifically, the present invention relates to a method for forming a multilayer coating film comprising the following steps (1) to (4):

(1) applying a base paint (X) to a substrate to form a base coating film,
(2) applying an effect pigment dispersion (Y) to the base coating film formed in step (1) to form an effect coating film with a thickness of 0.01 to 5 μm as a dry film thickness,
(3) applying a clear paint (Z) to the effect coating film formed in step (2) to form a clear coating film, and
(4) heating the uncured base coating film, the uncured effect coating film, and the uncured clear coating film formed in steps (1) to (3) to simultaneously cure these three coating films;
wherein the effect pigment dispersion (Y) contains an aluminum flake pigment (A), light-scattering particles (B), a hydroxy-containing acrylic resin (C), and water.

Advantageous Effects of Invention

The method for forming a multilayer coating film according to the present invention can provide a multilayer coating film that exhibits a high lightness overall from the highlight to the bottom, particularly being capable of imparting white metallic luster; and that is excellent in adhesion and water resistance.

DESCRIPTION OF EMBODIMENTS

Below, the method for forming a multilayer coating film according to the present invention is described in more detail.

Step (1)

Step (1) is to apply a base paint (X) to a substrate to form a base coating film.

Substrate

Examples of the substrate used in the method for forming a multilayer coating film of the present invention include metal materials, such as metals (e.g., iron, zinc, and aluminum) and alloys containing these metals; molded products of these metals; molded products of glass, plastic, or foamed articles; and films. These materials can be suitably subjected to degreasing treatment or surface treatment to obtain substrates. Examples of the surface treatment include phosphate treatment, chromate treatment, and composite oxide treatment. Further, when the material of the substrate is metal, a cationic electrodeposition coating film is preferably formed on a surface-treated metal material using a cationic electrodeposition paint. An intermediate coating film may be formed on the cationic electrodeposition coating film. The intermediate coating film is preferably colored from the standpoint of, for example, undercoat hiding power and weatherability. In particularly, when a base paint (X), described later, is transparent, a white intermediate coating film is preferably formed from the standpoint of excellent weatherability and white metallic luster of the multilayer coating film.

When the material of the substrate is plastic, a primer coating film is preferably formed on a degreased plastic material using a primer paint.

Base Paint (X)

Specifically, the base paint (X) for use may be a thermosetting paint that mainly containing a solvent and a thermosetting resin. Such thermosetting paints are known. The thermosetting paints may include a so-called intermediate paint. The base paint (X) may be transparent or colored.

Examples of the solvent used in the base paint (X) include organic solvents and/or water.

The thermosetting resin for use in the base paint (X) is preferably a combination of a base resin and a crosslinking agent, from the standpoint of, for example, water resistance, chemical resistance, and weatherability.

The base resin is preferably a resin that has excellent weatherability, transparency, and the like. Specific examples include acrylic resins, polyester resins, epoxy resins, and urethane resins.

Examples of acrylic resins include resins obtained by copolymerizing (meth)acrylic acid esters having a functional group, such as a carboxyl group, a hydroxyl group, an amide group, or a methylol group; other (meth)acrylic-acid esters; and styrene.

Examples of polyester resins for use include those obtained by a condensation reaction of polybasic acid, polyhydric alcohol, and optionally denatured oil by a conventional method.

Examples of epoxy resins include an epoxy resin obtained by a method in which an epoxy ester is synthesized by a reaction of an epoxy group and an unsaturated fatty acid, and an α,β-unsaturated acid is added to the unsaturated group; and an epoxy ester resin obtained by a method in which the hydroxyl group of an epoxy ester and a polybasic acid, such as phthalic acid or trimellitic acid, are esterified.

Examples of urethane resins include those obtained by reacting an acrylic resin, a polyester resin, or an epoxy resin described above with a diisocyanate compound to increase their molecular weight.

The base paint (X) may be an aqueous paint or a solvent-based paint. However, from the standpoint of reducing the VOCs in the paint, the base paint (X) is preferably an aqueous paint. When the base paint (X) is an aqueous paint, the base resin can be made soluble in water, or dispersed in water by using a resin containing a hydrophilic group, such as a carboxyl group, a hydroxyl group, a methylol group, an amino group, a sulfonic acid group, or a polyoxyethylene bond, most typically a carboxyl group, in an amount sufficient for making the resin soluble in water or dispersed in water; and neutralizing the hydrophilic group to form an alkali salt. The amount of the hydrophilic group (e.g., a carboxyl group) used in this case is not particularly limited, and can be suitably selected depending on the degree of solubilization or dispersion in water. However, the amount of the hydrophilic group is typically about 10 mg KOH/g or more, and preferably 15 to 200 mg KOH/g on an acid value basis. Examples of the alkaline substance used in neutralization include sodium hydroxide and amine compounds.

Dispersion of the above resin in water can also be performed by subjecting the monomer components to emulsion polymerization in the presence of a surfactant and a water-soluble resin. The aqueous dispersion can also be obtained by, for example, dispersing the above resin in water in the presence of an emulsifier. In the aqueous dispersion, the base resin may not contain the above hydrophilic group at all, or may contain the above hydrophilic group in an amount less than the amount of the water-soluble resin.

The crosslinking agent is a component used to crosslink and cure the base resin by heating. Examples include amino resins, polyisocyanate compounds, blocked polyisocyanate compounds, epoxy-containing compounds, carboxy-containing compounds, carbodiimide group-containing compounds, hydrazide group-containing compounds, and semicarbazide group-containing compounds. Preferable among these are amino resins reactive with a hydroxyl group, polyisocyanate compounds, blocked polyisocyanate compounds, and carbodiimide group-containing compounds reactive with a carboxyl group. Polyisocyanate compounds and blocked polyisocyanate compounds for use may be those described later in the "Clear Paint (Z)" section. These crosslinking agents can be used singly, or in a combination of two or more.

Specifically, amino resins obtained by condensation or co-condensation of formaldehyde with melamine, benzoguanamine, urea, or the like, or such amino resins that are further etherified with a lower monohydric alcohol, are suitably used. Polyisocyanate compounds or blocked polyisocyanate compounds can also be suitably used.

The ratio of each component in the base paint (X) may be freely selected as required. However, from the standpoint of, for example, water resistance and appearance, it is typically preferred that the ratio of the base resin be 60 to 90 mass %, and more preferably 70 to 85 mass %, based on the total mass of both the base resin and the crosslinking agent. The ratio of the crosslinking agent is preferably 10 to 40 mass %, and more preferably 15 to 30 mass %, based on the total mass of both the base resin and the crosslinking agent.

The base paint (X) may optionally contain a pigment. When the base paint (X) is transparent, the base paint (X) contains a pigment in an amount that does not impair the transparency of the base paint (X).

When the base paint (X) is colored, the type and amount of the pigment is preferably adjusted so that the lightness L* value in the L*a*b* color space of the coating film to be obtained, based on light that is illuminated at an angle of 45 degrees with respect to the coating film and that is received at an angle of 45 degrees deviated from the specular reflection light, is adjusted to 60 to 99, preferably 70 to 97, and more preferably 75 to 95 from the standpoint of obtaining a multilayer coating film with excellent white metallic luster. "Lightness L*" refers to a numerical value showing lightness in the L*a*b* color space, which was standardized in 1976 by the Commission Internationale de l'Eclairage, and which is also adopted in JIS Z 8729 in Japan. Specifically, it can be defined as a numerical value measured using an MA-68II multi-angle spectrophotometer (trade name, produced by X-Rite, Inc.).

Examples of the pigment include metallic pigments, rust preventive pigments, color pigments, and extender pigments. Of these, a color pigment is preferably used. From the standpoint of, for example, obtaining a coating film with excellent white metallic luster, a white pigment is more preferably used.

White pigments include titanium oxide, zinc oxide, aluminum oxide, magnesium oxide, antimony oxide, zirconium oxide, aluminum nitride, boron nitride, and white lead (zinc carbonate). Of these, titanium oxide is preferable due to its high refractive index. Titanium oxide can be in a rutile form or an anatase form, depending on the crystalline form. Although either form can be used in the present invention, titanium oxide in a rutile form may be usable from the standpoint of weatherability. Titanium oxide whose surface has been treated with an inorganic compound such as silica, zirconium, or aluminum may also be used for the purpose of increasing dispersibility or weatherability. From the standpoint of film-hiding power, the titanium oxide for use preferably has an average primary particle size of 100 to 500 nm, and more preferably 200 to 400 nm.

One or more color pigments other than the titanium oxide pigment may further be used in a suitable combination in the base paint (X), depending on, for example, undercoat hiding power and desired color.

An organic solvent may also optionally be used for the base paint (X). Specifically, organic solvents typically used in paints can be used. Examples of organic solvents include hydrocarbons, such as toluene, xylene, hexane, and heptane;

esters, such as ethyl acetate, butyl acetate, ethylene glycol monomethyl ether acetate, diethylene glycol monoethyl ether acetate, and diethylene glycol monobutyl acetate; ethers, such as ethylene glycol monomethyl ether, ethylene glycol diethyl ether, diethylene glycol monomethyl ether, and diethylene glycol dibutyl ether; alcohols, such as butanol, propanol, octanol, cyclohexanol, and diethylene glycol; ketones, such as methyl ethyl ketone, methyl isobutyl ketone, cyclohexanone, and isophorone; and other organic solvents. These can be used singly, or in a combination of two or more.

Of these solvents, organic solvents such as esters, ethers, alcohols, and ketones are preferable, from the standpoint of solubility.

The cured film thickness of the base coating film obtained using the base paint (X) is 1 µm or more, preferably 5 to 30 µm, and more preferably 10 to 25 µm, from the standpoint of, for example, light transmittance, undercoat hiding power, and white metallic luster.

The base paint (X) can be applied by a typical method. When the base paint (X) is an aqueous paint, for example, deionized water, and optional additives, such as a thickener and an antifoaming agent, are added to the base paint (X) to adjust the solids content to about 5 to 60 mass %, and to adjust the viscosity to 200 to 5000 cps/6 rpm (B-type (Brookfield-type) viscometer); and then the surface of a substrate can be coated with the base paint (X) by spray coating, rotary-atomization coating, or the like. When applying the base paint (X), electrostatic charges may optionally be applied.

When the base paint (X) is colored, the thickness of the monochrome hiding film is preferably 1 µm or more, more preferably 3 µm or more, and still more preferably 5 µm or more, from the standpoint of, for example, color stability. In the present specification, the "the thickness of the monochrome hiding film" is a value determined in the following manner. The monochrome checkered hiding power test paper specified in 4.1.2 of JIS K5600-4-1 is attached to a steel plate. Then, a paint is applied by inclined coating so that the film thickness continuously varies, and the paint is dried or cured. The coating surface is then visually observed under diffused daylight, and the minimum film thickness at which the monochrome border of the checker of the hiding power test paper disappears is measured with an electromagnetic film thickness meter.

Step (2)

Step (2) is to apply an effect pigment dispersion (Y) to the base coating film formed in step (1) to form an effect coating film with a thickness of 0.01 to 5.0 µm, as a dry film thickness. The dry film thickness is preferably 0.05 to 3.0 µm, and more preferably 0.1 to 2.0 µm.

Effect Pigment Dispersion (Y)

The effect pigment dispersion (Y) contains an aluminum flake pigment (A), light-scattering particles (B), a hydroxy-containing acrylic resin (C), and water.

Aluminum Flake Pigment (A)

The aluminum flake pigment (A) for use may be either a milling-type flake-aluminum pigment, typically produced by grinding and milling aluminum in a ball mill or Attritor mill in the presence of a grinding medium, using a grinding aid; or a vapor-deposition-type flake-aluminum pigment, described later. Grinding aids for use in the production process for a milling-type flake-aluminum pigment include aliphatic amines, aliphatic amides, and aliphatic alcohols; as well as higher fatty acids, such as oleic acid, stearic acid, isostearic acid, lauric acid, palmitic acid, and myristic acid. Grinding mediums for use include aliphatic hydrocarbons, such as mineral spirits.

The aluminum flake pigment (A) is broadly divided into leafing-type aluminum flake pigments and non-leafing type aluminum flake pigments, according to the type of grinding aid. A leafing-type aluminum flake pigment added to a paint composition is oriented (leafing) on the surface of the coating film formed by applying the paint composition, providing a finish with a strong feeling of metal, while exhibiting thermal reflex and an antirust effect. Thus, a leafing-type aluminum flake pigment is often used in plant facilities such as tanks, ducts, pipes, and rooftop roofing; and in various building materials.

The flake-aluminum pigment for use in the effect pigment dispersion according to the present invention may be a leafing-type flake-aluminum pigment. However, a flake-aluminum pigment of this type is oriented on the surface of a coating film due to the surface tension of the grinding aid during the process of forming the coating film, although it depends on the amount of the flake-aluminum pigment added. Thus, the use of a leafing-type flake-aluminum pigment requires caution in regards to adhesion of the pigment with the upper-layer clear coating film. From this viewpoint, a non-leafing-type flake-aluminum pigment is preferable for use.

The non-leafing-type flake-aluminum pigment for use may be one whose surface is not treated. Additionally, a non-leafing-type flake-aluminum pigment whose surface is coated with a resin; a non-leafing-type flake-aluminum pigment whose surface is treated with silica; or a non-leafing-type flake-aluminum pigment whose surface is treated with phosphoric acid, molybdic acid, or a silane coupling agent may also be used. The non-leafing-type flake-aluminum pigment for use may be one that has been subjected to one of these surface treatments, or one that has been subjected to two or more of these surface treatments.

A colored aluminum pigment (e.g., an aluminum flake pigment whose surface is coated with a color pigment, and further with a resin; and an aluminum flake pigment whose surface is coated with a metal oxide, such as iron oxide) may also be used.

Regarding the size of the aluminum flake pigment (A) for use, the aluminum flake pigment (A) preferably has an average particle size of 1 to 100 µm from the standpoint of appearance, lightness in the highlight, and changes in lightness from the highlight to the bottom of the coating film; and more preferably 5 to 50 µm, and particularly preferably 7 to 30 µm. The aluminum flake pigment (A) for use preferably has a thickness of 0.01 to 1.0 µm, and particularly preferably 0.02 to 0.5 µm. The "average particle size" as used here refers to a median size in a volume-weighted particle size distribution measured by laser diffraction scattering with a Microtrac MT3300 particle size distribution analyzer (trade name, produced by Nikkiso Co., Ltd.). The thickness is defined as the average of values of 100 or more particles determined such that the cross-section of a coating film containing the flake-aluminum pigment is observed with a microscope, and the thickness is measured using image-processing software.

An average particle size more than the upper limit described above may cause graininess due to the flake-aluminum pigment in the multilayer coating film, and an average particle size less than the lower limit described above may lead to an overly small change in lightness from the highlight to the bottom.

The aluminum flake pigment (A) for use in the effect pigment dispersion (Y) is preferably a vapor-deposition aluminum flake pigment (A1) from the standpoint of increased lightness in the highlight of the coating film obtained by applying the effect pigment dispersion (Y). The vapor-deposition aluminum flake pigment (A1) can be obtained by depositing an aluminum film on a base substrate, peeling off the base substrate, and grinding the vapor-deposition aluminum film. Examples of base substrates for use include films.

The vapor-deposition aluminum flake pigment (A1) for use may be a pigment formed from a single-layer vapor-deposition aluminum film, or a pigment formed from a multilayer vapor-deposition aluminum film in which another metal or a metal oxide is formed on a vapor-deposition aluminum film.

Examples of commercial products that can be used as the vapor-deposition aluminum flake pigment (A1) include "Metalure" series (trade name, produced by Eckart), "Hydroshine" series (trade name, produced by Eckart), "Decomet" series (trade name, produced by Schlenk), and "Metasheen" series (trade name, produced by BASF).

When the vapor-deposition aluminum flake pigment (A1) is used, the average thickness thereof is preferably 0.01 to 0.2 µm, and more preferably 0.02 to 0.1 µm. From the standpoint of stability in a paint, and appearance of the formed coating film, the average particle size (D50) thereof is preferably 1 to 50 µm, and more preferably 5 to 25 µm.

The vapor-deposition aluminum flake pigment (A1) for use may also be those that have been subjected to various surface treatments. From the standpoint of storage stability of the effect pigment dispersion (Y), a vapor-deposition aluminum flake pigment (A1) whose surface is treated with silica is preferable for use.

From the standpoint of obtaining a coating film excellent in white metallic luster, the content of the aluminum flake pigment (A) in the effect pigment dispersion (Y) according to the present invention is preferably 0.1 to 50.0 parts by mass, more preferably 1.0 to 40.0 parts by mass, and still more preferably 2.0 to 35.0 parts by mass, per 100 parts by mass of the solids content of the effect pigment dispersion (Y).

Additionally, when the vapor-deposition aluminum flake pigment (A1) is used, the content of the vapor-deposition aluminum flake pigment (A1) is preferably 0.1 to 30.0 parts by mass, and particularly preferably 0.2 to 25.0 parts by mass, per 100 parts by mass of the solids content of the effect pigment dispersion (Y).

Light-Scattering Particles (B)

The light-scattering particles (B) are used for high lightness near the highlight of the multilayer coating film. The light-scattering particles (B) also enable the perception of whiteness of the multilayer coating film from the highlight to the bottom. The light-scattering particles (B) include titanium oxide, mica, silica, baryta, glass, alumina, Chinese white, and white lead. These substances may be used singly, or in a combination of two or more. Mica, silica, glass, and alumina may be coated with a metal oxide.

In particular, from the standpoint of obtaining a coating film excellent in white metallic luster, the use of titanium oxide, mica, silica, baryta, or glass is preferable, and the use of titanium oxide is more preferable.

Titanium oxide can be in a rutile form or an anatase form, depending on the crystalline form. Although either form can be used in the present invention, titanium oxide in a rutile form may be usable from the standpoint of weatherability. Titanium oxide whose surface has been treated with an inorganic compound such as silica, zirconium, or aluminum may also be used, for the purpose of increasing dispersibility or weatherability. The titanium oxide for use preferably has an average primary particle size of 100 to 500 nm, and more preferably 200 to 400 nm.

Commercial products of titanium oxide include Ti-Pure R-100, Ti-Pure R-101, Ti-Pure R-102, Ti-Pure R-103, Ti-Pure R-104, Ti-Pure R-105, Ti-Pure R-108, Ti-Pure R-900, Ti-Pure R-902, Ti-Pure R-960, Ti-Pure R-706, and Ti-Pure R-931 (all from DuPont, trade name); Tipaque CR-93, Tipaque CR-95, and Tipaque CR-97 (all from Ishihara Sangyo Kaisha, Ltd., trade name); and JR-301, JR-403, JR-405, JR-600A, JR-605, JR-600E, JR805, JR-806, JR-701, and JR-901 (all from Tayca Corporation, trade name).

From the standpoint of obtaining a coating film excellent in white metallic luster, the content of the light-scattering particles (B) in the effect pigment dispersion (Y) according to the present invention is preferably 10.0 to 95.0 parts by mass, more preferably 20.0 to 90.0 parts by mass, and still more preferably 25.0 to 80.0 parts by mass, per 100 parts by mass of the solids content of the effect pigment dispersion (Y).

Hydroxy-Containing Acrylic Resin (C)

The hydroxy-containing acrylic resin (C) is an acrylic resin that has at least one hydroxyl group per molecule. The hydroxy-containing acrylic resin (C) for use may be a known water-soluble or water-dispersible hydroxy-containing acrylic resin that is traditionally used in aqueous paints. The hydroxy-containing acrylic resin (C) can be produced, for example, by copolymerizing a hydroxy-containing polymerizable unsaturated monomer with another polymerizable unsaturated monomer copolymerizable with the hydroxy-containing polymerizable unsaturated monomer by a known method, such as solution polymerization.

The hydroxy-containing polymerizable unsaturated monomer is a compound that has at least one hydroxyl group and at least one polymerizable unsaturated bond per molecule. Examples of hydroxy-containing polymerizable unsaturated monomers include monoester compounds of a glycol with acrylic acid or methacrylic acid (e.g., hydroxyethyl (meth)acrylate, hydroxypropyl (meth)acrylate, hydroxybutyl (meth)acrylate, and polyethylene glycol mono (meth)acrylate); and compounds obtained by subjecting a monoester compound formed of a polyhydric alcohol described above and acrylic acid or methacrylic acid to ring-opening polymerization with ε-caprolactone.

Another polymerizable unsaturated monomer copolymerizable with the hydroxy-containing polymerizable unsaturated monomer can be suitably selected depending on the properties desired for the hydroxy-containing acrylic resin. Specific examples of such monomers are listed below. These monomers can be used singly, or in a combination of two or more.

In the present specification, the term "(meth)acrylate" refers to acrylate or methacrylate. The term "(meth)acrylic acid" refers to acrylic acid or methacrylic acid. The term "(meth)acryloyl" refers to acryloyl or methacryloyl. The term "(meth)acrylamide" refers to acrylamide or methacrylamide.

(i) Alkyl or cycloalkyl (meth)acrylate: examples include methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, dodecyl (meth)acrylate, tridecyl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, and tricyclodecanyl (meth)acrylate.

(ii) Isobornyl group-containing polymerizable unsaturated monomers: examples include isobornyl (meth)acrylate.

(iii) Adamanthyl group-containing polymerizable unsaturated monomers: examples include adamanthyl (meth)acrylate.

(iv) Tricyclodecenyl group-containing polymerizable unsaturated monomers: examples include tricyclodecenyl (meth)acrylate.

(v) Aromatic ring-containing polymerizable unsaturated monomers: examples include benzyl (meth)acrylate, styrene, α-methylstyrene, and vinyltoluene.

(vi) Alkoxysilyl group-containing polymerizable unsaturated monomers: examples include vinyltrimethoxysilane, vinyltriethoxysilane, vinyltris(2-methoxyethoxy)silane, γ-(meth) acryloyloxypropyl trimethoxysilane, and γ-(meth) acryloyloxypropyl triethoxysilane.

(vii) Fluorinated alkyl group-containing polymerizable unsaturated monomers: examples include perfluoroalkyl (meth)acrylates, such as a perfluorobutylethyl (meth)acrylate and perfluorooctylethyl (meth)acrylate; and fluoroolefins.

(viii) Photopolymerizable functional group-containing polymerizable unsaturated monomers, such as a maleimide group.

(ix) Vinyl compounds: examples include N-vinylpyrrolidone, ethylene, butadiene, chloroprene, vinyl propionate, and vinyl acetate.

(x) Phosphate group-containing polymerizable unsaturated monomers: examples include 2-acryloyloxyethyl acid phosphate, 2-methacryloyloxyethyl acid phosphate, 2-acryloyloxypropyl acid phosphate, and 2-methacryloyloxypropyl acid phosphate.

(xi) Carboxy-containing polymerizable unsaturated monomers: examples include (meth)acrylic acid, maleic acid, crotonic acid, and β-carboxyethyl acrylate.

(xii) Nitrogen-containing polymerizable unsaturated monomers: examples include adducts of (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, methylenebis (meth)acrylamide, ethylenebis (meth)acrylamide, 2-(methacryloyloxy) ethyltrimethylammonium chloride, or glycidyl (meth)acrylate with amines.

(xiii) Polymerizable unsaturated monomers having at least two polymerizable unsaturated groups per molecule: examples include allyl (meth)acrylate, and 1,6-hexanediol di(meth)acrylate.

(xiv) Epoxy group-containing polymerizable unsaturated monomers: examples include glycidyl (meth)acrylate, R-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, and allyl glycidyl ether.

(xv) (Meth)acrylates that have a polyoxyethylene chain whose molecular end is an alkoxy group.

(xvi) Sulfonic group-containing polymerizable unsaturated monomers: examples include 2-acrylamido-2-methylpropanesulfonic acid, 2-sulfoethyl (meth)acrylate, allylsulfonic acid, 4-styrenesulfonic acid, sodium salts of these sulfonic acids, and ammonium salts of these sulfonic acids.

(xvii) Polymerizable unsaturated monomers having an UV-absorbing functional group: examples include 2-hydroxy-4-(3-methacryloyloxy 2-hydroxypropoxy) benzophenone, 2-hydroxy-4-(3-acryloyloxy-2-hydroxypropoxy) benzophenone, 2,2'-dihydroxy-4-(3-methacryloyloxy 2-hydroxypropoxy) benzophenone, 2,2'-dihydroxy-4-(3-acryloyloxy 2-hydroxypropoxy) benzophenone, and 2-(2'-hydroxy-5'-methacryloyloxyethylphenyl)-2H-benzotriazole.

(xviii) Light-stable polymerizable unsaturated monomers: examples include 4-(meth)acryloyloxy-1,2,2,6,6-pentamethylpiperidine, 4-(meth)acryloyloxy 2,2,6,6-tetramethylpiperidine, 4-cyano-4-(meth) acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, and 1-crotonoyl-4-crotonoyloxy-2,2,6,6-tetramethylpiperidine.

(xix) Carbonyl group-containing polymerizable unsaturated monomers: examples include acrolein, diacetone acrylamide, diacetone methacrylamide, acetoacetoxyethyl methacrylate, formylstyrol, and vinyl alkyl ketones having 4 to 7 carbon atoms (e.g., vinyl methyl ketone, vinyl ethyl ketone, and vinyl butyl ketone).

(xx) Acid anhydride group-containing polymerizable unsaturated monomers: examples include maleic anhydride, itaconic anhydride, and citraconic anhydride.

The hydroxy-containing acrylic resin (C) preferably has a hydroxy value of 10 to 150 mg KOH/g, and more preferably 50 to 100 mg KOH/g. The hydroxy-containing acrylic resin (C) preferably has an acid value of 150 mg KOH/g or less, and more preferably 145 mg KOH/g or less. The hydroxy-containing acrylic resin (C) preferably has a weight average molecular weight of 1000 to 100000, and more preferably 2000 to 60000.

In the present specification, the term "weight average molecular weight" of the hydroxy-containing acrylic resin and the term "number average molecular weight" of the hydroxy-containing polyester resin and the melamine resin refer to a value determined by converting the retention time (retention volume) measured with gel permeation chromatography (GPC) into a molecular weight of a polystyrene based on the retention time (retention volume) of a polystyrene standard with a known molecular weight measured under the same conditions.

Specifically, measurement is performed with a HLC-8120GPC gel permeation chromatograph analyzer (trade name, produced by Tosoh Corporation), using four columns (TSKgel G4000HXL, TSKgel G3000HXL, TSKgel G2500HXL, and TSKgel G2000HXL; trade names, all produced by Tosoh Corporation), with a differential refractometer as a detector, under the conditions of mobile phase: tetrahydrofuran, measurement temperature: 40° C., and flow rate: 1 mL/min.

From the standpoint of obtaining a coating film excellent in, for example, white metallic luster, water resistance, and adhesion, the content of the hydroxy-containing acrylic resin (C) in the effect pigment dispersion (Y) is preferably 0.1 to 30.0 parts by mass, more preferably 0.5 to 20.0 parts by mass, and still more preferably 1.0 to 15.0 parts by mass, per 100 parts by mass of the solids content of the effect pigment dispersion (Y).

Surface Adjusting Agent (D)

The effect pigment dispersion (Y) preferably further contains a surface adjusting agent (D). The surface adjusting agent is used to facilitate uniform orientation of the aluminum flake pigment (A) dispersed in water on the surface of the base coating film when the effect pigment dispersion (Y) is applied to the surface of the base coating film. Orientating the aluminum flake pigment (A) uniformly on the surface of the base coating film leads to a multilayer coating film excellent in metallic luster, with sharp changes in lightness.

The surface adjusting agent (D) preferably has a contact angle of 8 to 20°, preferably 9 to 190, and more preferably 10 to 180, with respect to a tin plate degreased beforehand (produced by Paltek Corporation). The contact angle is measured as follows. A liquid that is a mixture of isopropanol, water, and a surface adjusting agent in a ratio of 4.5/95/1 is adjusted to have a viscosity of 150 mPa·s measured with a Brookfield type viscometer at a rotor rotational speed of 60 rpm at a temperature of 20° C.; and 10 μL of the liquid is added dropwise to the tin plate. Then, the contact angle with respect to the tin plate is measured 10 seconds after dropping the liquid.

The mass ratio 4.5/95/1, which is the ratio of isopropanol/water/surface adjusting agent, substantially corresponds to the component ratio of the effect pigment dispersion (Y) for evaluating the surface adjusting agent. The viscosity, 150 mPa·s, measured with a Brookfield type viscometer at a rotor rotational speed of 60 rpm is a normal value at the time the effect pigment dispersion (Y) is applied to the surface of a base coating film. The contact angle, 8 to 200, with respect to the tin plate represents spread of the liquid under standard coating conditions. A contact angle of 80 or more enables the liquid to be applied to the surface of a base coating film without the liquid being overly spread, and a contact angle of 200 or less enables the liquid to be uniformly applied to the surface of the base coating film without the liquid being overly repelled.

Examples of the surface adjusting agent (D) include silicone-based surface adjusting agents, acrylic-based surface adjusting agents, vinyl-based surface adjusting agents, and fluorine-based surface adjusting agents. These surface adjusting agents can be used singly, or in a combination of two or more.

Examples of commercial products of the surface adjusting agent (D) include BYK series (produced by BYK-Chemie), Tego series (produced by Evonik), Glanol series and Polyflow series (produced by Kyoeisha Chemical Co., Ltd.), and Disparlon series (produced by Kusumoto Chemicals, Ltd.).

The surface adjusting agent (D) is preferably a silicone-based surface adjusting agent, from the standpoint of, for example, the metallic luster and water resistance of the obtained coating film. Silicone-based surface adjusting agents for use include polydimethylsiloxane, and modified silicone obtained by modifying polydimethylsiloxane. Examples of modified silicone include polyether-modified silicone, acrylic-modified silicone, and polyester-modified silicone.

The dynamic surface tension of the surface adjusting agent (D) is preferably 50 to 70 mN/m, more preferably 53 to 68 mN/m, and still more preferably 55 to 65 mN/m. In the present specification, the dynamic surface tension refers to a surface tension value measured by the maximum bubble pressure method at a frequency of 10 Hz. The dynamic surface tension was measured with a SITA tensiometer (SITA t60, produced by EKO Instruments).

The static surface tension of the surface adjusting agent (D) is preferably 15 to 30 mN/m, more preferably 18 to 27 mN/m, and still more preferably 20 to 24 mN/m. The static surface tension was measured with a surface tensiometer (DCAT 21, produced by EKO Instruments).

The lamellar length of the surface adjusting agent (D) is preferably 6.0 to 9.0 mm, more preferably 6.5 to 8.5 mm, and still more preferably 7.0 to 8.0 mm.

When the effect pigment dispersion (Y) contains the surface adjusting agent (D), the effect pigment dispersion (Y) may contain preferably 1 to 60 parts by mass, more preferably 2 to 55 parts by mass, and still more preferably 4 to 50 parts by mass, per 100 parts by mass (solids content) of the effect pigment dispersion, from the standpoint of obtaining a multilayer coating film with metallic luster.

Rheology Control Agent (E)

The effect pigment dispersion (Y) may further contain a rheology control agent (E). The rheology control agent (E) for use may be a known rheology control agent. Examples include silica-based fine powder, mineral-based rheology control agents, barium sulfate fine powder, polyamide-based rheology control agents, organic-resin-fine-particle rheology control agents, diurea-based rheology control agents, urethane association-type rheology control agents, polyacrylic acid-based rheology control agents, which are acrylic swelling-type, and cellulose-based rheology control agents. Of these, particularly from the standpoint of obtaining a coating film with excellent metallic luster, it is preferable to use a mineral-based rheology control agent, a polyacrylic acid-based rheology control agent, or a cellulose-based rheology control agent.

Examples of mineral-based rheology control agents include swelling laminar silicate that has a 2:1 crystalline structure. Specific examples include smectite clay minerals, such as natural or synthetic montmorillonite, saponite, hectorite, stevensite, beidellite, nontronite, bentonite, and laponite; swelling mica clay minerals, such as Na-type tetrasilicic fluorine mica, Li-type tetrasilicic fluorine mica, Na salt-type fluorine taeniolite, and Li-type fluorine taeniolite; vermiculite; substituted products or derivatives thereof; and mixtures thereof.

Examples of polyacrylic acid-based rheology control agents include sodium polyacrylate, and polyacrylic acid-(meth)acrylic acid ester copolymers.

The active ingredient acid value of the polyacrylic acid-based rheology control agent may be 30 to 300 mg KOH/g, and preferably 80 to 280 mg KOH/g. Examples of commercial products of polyacrylic acid-based rheology control agents include "Primal ASE-60," "Primal TT615," and "Primal RM5" (trade names, produced by The Dow Chemical Company); and "SN Thickener 613," "SN Thickener 618," "SN Thickener 630," "SN Thickener 634," and "SN Thickener 636" (trade names, produced by San Nopco Limited).

Examples of cellulose-based rheology control agents include carboxymethylcellulose, methylcellulose, hydroxyethylcellulose, hydroxyethylmethylcellulose, hydroxypropylmethylcellulose, and cellulose nanofibers. Of these, cellulose nanofibers are particularly preferably used, from the standpoint of obtaining a coating film with excellent metallic luster.

The cellulose nanofibers may also be referred to as cellulose nanofibrils, fibrillated cellulose, or nanocellulose crystals.

The cellulose nanofibers have a number average fiber diameter of preferably 2 to 500 nm, more preferably 2 to 250 nm, and still more preferably 2 to 150 nm, from the standpoint of obtaining a coating film with excellent metallic luster. The cellulose nanofibers also have a number average fiber length of preferably 0.1 to 20 μm, more preferably 0.1 to 15 μm, and still more preferably 0.1 to 10 μm. The aspect ratio determined by dividing the number average fiber length by the number average fiber diameter is preferably 50 to 10000, more preferably 50 to 5000, and still more preferably 50 to 1000.

The number average fiber diameter and number average fiber length are measured and calculated from, for example, an image obtained by subjecting a sample (cellulose nanofibers diluted with water) to a dispersion treatment, casting the sample on a grid coated with a carbon film that has been subjected to hydrophilic treatment, and observing the sample with a transmission electron microscope (TEM).

The cellulose nanofibers for use may be those obtained by defibrating a cellulose material, and stabilizing it in water.

An aqueous dispersion obtained by anionically modifying a cellulose material by a known method, subjecting it to various treatments, and dispersing it in an aqueous solvent is also usable. For example, cellulose nanofibers prepared as follows are also usable. Groups such as carboxyl groups and carboxymethyl groups are introduced into a cellulose material by a known method, and the obtained modified cellulose is washed to prepare a dispersion of the modified cellulose, followed by adding a mechanical shear force to this dispersion to defibrate the modified cellulose.

Examples of commercial products of cellulose nanofibers include Rheocrysta (registered trademark) produced by DKS Co. Ltd. In the present invention, for example, cellulose nanofibers prepared in the following manner can be used.

The cellulose nanofibers described above are produced, for example, by the following method.

Groups such as carboxyl groups and carboxymethyl groups are introduced into a cellulose material by a known method, and the obtained modified cellulose is washed to prepare a dispersion of the modified cellulose; followed by adding a mechanical shear force to this dispersion to defibrate the modified cellulose.

The cellulose material as used here refers to cellulose-main materials in various forms. Specific examples include pulp (e.g., grass plant-derived pulp, such as wood pulp, jute, Manila hemp, and kenaf); natural cellulose, such as cellulose produced by microorganisms; regenerated cellulose obtained by dissolving cellulose in a copper ammonia solution or a solvent such as a morpholine derivative, and subjecting the dissolved cellulose to spinning; and fine cellulose obtained by subjecting the cellulose material to mechanical treatment, such as hydrolysis, alkali hydrolysis, enzymatic decomposition, blasting treatment, or vibration ball milling, to depolymerize the cellulose.

The method for defibrating the cellulose material can be any method that enables the cellulose material to remain in a fibrous form. Examples of the method include mechanical defibration treatment using, for example, a homogenizer or a grinder; chemical treatment using, for example, an oxidation catalyst; and biological treatment using, for example, microorganisms.

Cellulose nanofibers for use may be anionically modified cellulose nanofibers. Examples of anionically modified cellulose nanofibers include carboxylated cellulose nanofibers, carboxymethylated cellulose nanofibers, and phosphate group-containing cellulose nanofibers. The anionically modified cellulose nanofibers can be obtained, for example, by incorporating functional groups such as carboxyl groups, carboxymethyl groups, and phosphate groups into a cellulose material by a known method; washing the obtained modified cellulose to prepare a dispersion of the modified cellulose; and defibrating this dispersion. The carboxylated cellulose is also referred to as oxidized cellulose.

The oxidized cellulose can be obtained, for example, by oxidizing the cellulose material in water using an oxidizing agent in the presence of a compound selected from the group consisting of N-oxyl compounds, bromides, iodides, and mixtures thereof.

The amount of an N-oxyl compound can be any amount, as long as the amount is a catalytic amount that can disintegrate cellulose into nanofibers. The amount of a bromide or iodide can be suitably selected within the range in which an oxidation reaction is promoted.

The oxidizing agent for use may be a known oxidizing agent. Examples include halogen; hypohalous acid; halous acid; perhalogenic acid; salts of them; halogen oxide; and peroxide. It is preferable to set the conditions so that the amount of carboxyl groups in oxidized cellulose is 0.2 mmol/g or more based on the solids content mass of the oxidized cellulose. The amount of carboxyl groups can be adjusted, for example, by performing the following: adjustment of oxidation reaction time; adjustment of oxidation reaction temperature; adjustment of pH in oxidation reaction; and adjustment of the amount of an N-oxyl compound, a bromide, an iodide, an oxidizing agent, or the like.

Carboxymethyl groups can be introduced in the following manner.

A cellulose material and a solvent are mixed, and mercerization treatment is performed using 0.5 to 20-fold mols of alkali hydroxide metal per glucose residue of the cellulose material as a mercerization reagent at a reaction temperature of 0 to 70° C. for a reaction time of about 15 minutes to 8 hours. Thereafter, 0.05 to 10.0-fold mols of a carboxymethylating agent per glucose residue is added thereto; followed by reaction at a reaction temperature of 30 to 90° C. for a reaction time of about 30 minutes to 10 hours to introduce carboxymethyl groups into the hydroxyl groups of the cellulose molecules.

The degree of substitution of carboxymethyl per glucose unit in the modified cellulose obtained by introducing carboxymethyl groups into the cellulose material is preferably 0.02 to 0.50.

The thus-obtained modified cellulose can be dispersed in an aqueous solvent to form a dispersion, and the dispersion can then be defibrated using a grinder. The grinder for use may be any of the following: a high-speed shearing grinder, a collider grinder, a bead mill grinder, a high-speed rotating grinder, a colloid mill grinder, a high-pressure grinder, a roll mill grinder, and an ultrasonic grinder. These grinders may also be used in a combination of two or more. Of these, a high-speed shearing defibrator, a collider defibrator, and a high-speed rotating defibrator are preferably used, because higher shear force can be applied with less risk of contamination by media.

When the cellulose-based rheology control agent is used in the effect pigment dispersion (Y), the content of the cellulose-based rheology control agent is preferably 2 to 150 parts by mass, more preferably 3 to 120 parts by mass, and particularly preferably 4 to 100 parts by mass, per 100 parts by mass of the content of the aluminum flake pigment (A), from the standpoint of obtaining a coating film with excellent metallic luster.

These rheology control agents may be used singly, or in a combination of two or more.

The content of the rheology control agent (E) in the effect pigment dispersion (Y) is preferably 0.1 to 50 parts by mass, more preferably 1 to 35 parts by mass, and still more preferably 5 to 25 parts by mass, per 100 parts by mass (solids content) of the effect pigment dispersion, from the standpoint of obtaining a multilayer coating film with metallic luster.

The effect pigment dispersion (Y) may further suitably contain, if necessary, a resin other than the hydroxy-containing acrylic resin (C), a crosslinking agent, an organic solvent, a color pigment, an extender pigment, a pigment dispersant, an antisettling agent, an antifoaming agent, and an ultraviolet absorber.

Examples of resins other than the hydroxy-containing acrylic resin (C) include polyester resins, alkyd resins, urethane resins, and acrylic resins free of hydroxyl groups.

Examples of crosslinking agents include melamine resins, melamine resin derivatives, urea resins, (meth)acrylamide, polyaziridine, polycarbodiimide, and blocked or unblocked polyisocyanate compounds. These crosslinking agents may be used singly, or in a combination of two or more.

In particular, from the standpoint of water resistance and adhesion of the obtained coating film, a blocked polyisocyanate compound is preferable.

A blocked polyisocyanate compound is a polyisocyanate compound having a blocking agent added to its isocyanate group. Although the blocked polyisocyanate compound generated by adding a blocking agent is stable at room temperature, it is preferred that when the blocked polyisocyanate compound is heated to a baking temperature of a coating film (typically about 80 to 200° C.), the blocking agent dissociates, enabling liberated isocyanate groups to regenerate. Examples of blocking agents that satisfy this requirement include phenol-based blocking agents, lactam-based blocking agents, alcohol-based blocking agents, ether-based blocking agents, oxime-based blocking agents, active methylene-based blocking agents, mercaptan-based blocking agents, acid amid-based blocking agents, imide-based blocking agents, amine-based blocking agents, imidazole-based blocking agents, and pyrazole-based blocking agents. In particular, from the standpoint of, for example, water resistance and adhesion of the obtained coating film, a pyrazole-based blocked polyisocyanate compound is preferably used.

Color pigments include carbon black, zinc molybdate, calcium molybdate, Prussian blue, ultramarine blue, cobalt blue, copper phthalocyanine blue, indanthrone blue, chrome yellow, synthetic yellow iron oxide, bismuth vanadate, titanium yellow, zinc chrome (zinc yellow), monoazo yellow, ocher, disazo, isoindolinone yellow, metallic-complex-salt azo yellow, quinophthalone yellow, benzimidazolone yellow, red iron oxide, monoazo red, unsubstituted quinacridone red, azo lake (Mn salts), quinacridone magenta, anthanthrone orange, dianthraquinonyl red, perylene maroon, quinacridone magenta, perylene red, diketopyrrolopyrrole chrome vermilion, chlorinated phthalocyanine green, brominated phthalocyanine green; and others, such as pyrazolone orange, benzimidazolone orange, dioxazine violet, and perylene violet.

Amount of Each Component of Effect Pigment Dispersion (Y)

The effect pigment dispersion (Y) contains the aluminum flake pigment (A), light-scattering particles (B), hydroxy-containing acrylic resin (C), and water. The amount of each component in the effect pigment dispersion (Y) is preferably within the following range, from the standpoint of obtaining a coating film with excellent metallic luster.

Per 100 parts by mass of the total amount of the aluminum flake pigment (A), the light-scattering particles (B), the hydroxy-containing acrylic resin (C) and water, the aluminum flake pigment (A) (on a solids content basis) is preferably present in an amount of 0.1 to 5.0 parts by mass, more preferably 0.1 to 3.0 parts by mass, and still more preferably 0.2 to 2.0 parts by mass; the light-scattering particles (B) (on a solids content basis) are preferably present in an amount of 0.1 to 40.0 parts by mass, more preferably 0.3 to 20.0 parts by mass, and still more preferably 0.5 to 15.0 parts by mass; the hydroxy-containing acrylic resin (C) (on a solids content basis) is preferably present in an amount of 0.01 to 5.0 parts by mass, more preferably 0.02 to 3.5 parts by mass, and still more preferably 0.03 to 2.0 parts by mass; and water is preferably present in an amount of 50 to 99.5 parts by mass, more preferably 75 to 96.0 parts by mass, and still more preferably 81 to 95.0 parts by mass.

When the effect pigment dispersion (Y) contains the surface adjusting agent (D), the content of the surface adjusting agent is, on a solids content basis, preferably 0.1 to 10.0 parts by mass, more preferably 0.2 to 5.0 parts by mass, and still more preferably 0.4 to 2.0 parts by mass, per 100 parts by mass of the total amount of the aluminum flake pigment (A), the light-scattering particles (B), the hydroxy-containing acrylic resin (C), and water, from the standpoint of obtaining a multilayer coating film with metallic luster.

When the effect pigment dispersion (Y) contains the rheology control agent (E), the content of the rheology control agent is, on a solids content basis, preferably 0.01 to 5.0 parts by mass, more preferably 0.1 to 3.0 parts by mass, and still more preferably 0.15 to 1.0 part by mass, per 100 parts by mass of the total amount of the aluminum flake pigment (A), the light-scattering particles (B), the hydroxy-containing acrylic resin (C), and water, from the standpoint of obtaining a multilayer coating film with metallic luster.

Coating of Effect Pigment Dispersion (Y)

The effect pigment dispersion (Y) is prepared by mixing and dispersing the components described above. From the standpoint of obtaining a coating film with excellent metallic luster, the solids content during coating is adjusted to preferably 0.1 to 25.0 mass %, more preferably 1.0 to 20.0 mass %, and still more preferably 1.0 to 9.0 mass %, based on the effect pigment dispersion (Y).

The viscosity of the effect pigment dispersion (Y) as measured at a temperature of 20° C. with a Brookfield-type viscometer at 60 rpm after 1 minute (also referred to as "the B60 value" in the present specification) is preferably 60 to 1500 mPa·s, more preferably 60 to 1000 mPa·s, and still more preferably 60 to 500 mPa·s, from the standpoint of obtaining a coating film with excellent metallic luster. The viscometer for use in this case is an LVDV-I viscometer (trade name, produced by Brookfield, Brookfield-type viscometer).

The effect pigment dispersion (Y) can be applied by a method, such as electrostatic coating, air spray, or airless spray. In the method for forming a multilayer coating film of the present invention, rotary-atomization electrostatic coating is particularly preferable.

It is preferred that the effect coating film obtained by applying the effect pigment dispersion (Y) be dried.

The method for drying the effect coating film is not particularly limited. Examples include a method that allows the coating film to stand at room temperature for 15 to 30 minutes; and a method that performs preheating at a temperature of 50 to 100° C. for 30 seconds to 10 minutes.

The film thickness of the effect coating film 30 seconds after the effect pigment dispersion (Y) is adhered to the base coating film is preferably 3 to 50 μm, more preferably 4 to 48 μm, and still more preferably 5 to 46 μm, from the standpoint of obtaining a coating film with excellent metallic luster.

Step (3) Step (3) is to apply a clear paint (Z) to the effect coating film formed in step (2) to form a clear coating film.

Clear Paint (Z)

The clear paint (Z) for use may be any known thermosetting clear-coat paint composition. Examples of thermosetting clear-coat paint compositions include organic solvent-based thermosetting paint compositions containing a base resin having a crosslinkable functional group and a crosslinking agent; aqueous thermosetting paint compositions containing a base resin having a crosslinkable functional group and a crosslinking agent; and powdery thermosetting paint compositions containing a base resin having a crosslinkable functional group and a crosslinking agent.

Examples of crosslinkable functional groups present in the base resin include carboxyl groups, hydroxyl groups, epoxy groups, and silanol groups. Examples of the type of base resin include acrylic resins, polyester resins, alkyd resins, urethane resins, epoxy resins, and fluororesins. Examples of crosslinking agents include polyisocyanate compounds, blocked polyisocyanate compounds, melamine resins, urea resins, carboxy-containing compounds, carboxy-containing resins, epoxy-containing resins, and epoxy-containing compounds.

The combination of a base resin and a crosslinking agent in the clear paint (Z) is, for example, preferably a combination of a carboxy-containing resin and an epoxy-containing resin, a combination of a hydroxy-containing resin and a polyisocyanate compound, a combination of a hydroxy-containing resin and a blocked polyisocyanate compound, and a combination of a hydroxy-containing resin and a melamine resin.

The clear paint (Z) may be a one-component paint or a multiple-component paint, such as a two-component urethane resin paint.

In particular, the clear paint (Z) is preferably a two-component clear paint containing a hydroxy-containing resin and a polyisocyanate compound, from the standpoint of the adhesion of the obtained coating film.

When the clear paint (Z) for use is a two-component clear paint containing a hydroxy-containing resin and a polyisocyanate compound, the hydroxy-containing resin and the polyisocyanate compound are preferably separated from the standpoint of storage stability. Both are mixed immediately before use.

When the clear paint (Z) for use is a one-component paint, examples of combinations of a base resin and a crosslinking agent in such a one-component paint include a carboxy-containing resin and an epoxy-containing resin, a hydroxy-containing resin and a blocked polyisocyanate compound, and a hydroxy-containing resin and a melamine resin. When the clear paint (Z) for use is a one-component paint, the clear paint (Z) preferably contains a self-crosslinkable component from the standpoint of adhesion.

The self-crosslinkable component includes melamine resins, melamine resin derivatives, (meth)acrylamide, polyaziridine, polycarbodiimide, and blocked or unblocked polyisocyanate. These substances may be used singly, or in a combination of two or more.

The clear paint (Z) may further suitably contain one or more additives, such as a solvent (e.g., water and organic solvents), a curing catalyst, an antifoaming agent, and an ultraviolet absorber, if necessary.

Hydroxy-Containing Resin

The hydroxy-containing resin for use may be a known resin that has a hydroxyl group without any limitation. Examples of hydroxy-containing resins include hydroxy-containing acrylic resins, hydroxy-containing polyester resins, hydroxy-containing polyether resins, and hydroxy-containing polyurethane resins; preferably hydroxy-containing acrylic resins and hydroxy-containing polyester resins; and particularly preferably hydroxy-containing acrylic resins.

The hydroxy-containing acrylic resin has a hydroxy value of preferably 80 to 200 mg KOH/g, and more preferably 100 to 180 mg KOH/g. A hydroxy value of 80 mg KOH/g or more leads to sufficient scratch resistance due to the high crosslinking density. A hydroxy value of 200 mg KOH/g or less enables the coating film to maintain water resistance.

The hydroxy-containing acrylic resin has a weight average molecular weight of preferably 2500 to 40000, and more preferably 5000 to 30000. A weight average molecular weight of 2500 or more leads to excellent coating film properties, such as acid resistance. A weight average molecular weight of 40000 or less enables the coating film to maintain the smoothness, thus resulting in excellent appearance.

The glass transition temperature of the hydroxy-containing acrylic resin is preferably −40° C. to 20° C., in particular −30° C. to 10° C. A glass transition temperature of −40° C. or more leads to sufficient coating film hardness. A glass transition temperature of 20° C. or less enables the coating film to maintain smoothness of the coating surface.

Polyisocyanate Compound

A polyisocyanate compound is a compound having at least two isocyanate groups per molecule. Examples include aliphatic polyisocyanates, alicyclic polyisocyanates, aromatic-aliphatic polyisocyanates, aromatic polyisocyanates, and derivatives of these polyisocyanates.

Examples of aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and methyl 2,6-diisocyanatohexanoate (common name: lysine diisocyanate); and aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane.

Examples of alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, and methylenebis(4,1-cyclohexanediyl)diisocyanate (common name: hydrogenated MDI), and norbornane diisocyanate; and alicyclic triisocyanates, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1) heptane, 2-(3-isocyanatopropyl)-2,6-di(isocyanatomethyl)-bicyclo(2.2.1)heptane, 3-(3-isocyanatopropyl)-2,5-di (isocyanatomethyl)-bicyclo(2.2.1)heptane, 5-(2-isocyanatoethyl)-2-isocyanatomethy-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1)heptane.

Examples of aromatic-aliphatic polyisocyanates include aromatic-aliphatic diisocyanates, such as methylenebis(4,1-phenylene)diisocyanate (common name: MDI), 1,3- or 1,4-xylylene diisocyanate or mixtures thereof, ω,ω'-diisocyanato-1,4-diethylbenzene, and 1,3- or 1,4-bis(1-isocyanato-1-methylethyl)benzene (common name: tetramethylxylylene diisocyanate) or mixtures thereof; and aromatic-aliphatic triisocyanates, such as 1,3,5-triisocyanatomethylbenzene.

Examples of aromatic polyisocyanates include aromatic diisocyanates, such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI), or 2,6-tolylene diisocyanate (common name: 2,6-TDI) or mixtures thereof, 4,4'-toluidine diisocyanate, and 4,4'-diphenylether diisocyanate; aromatic triisocyanates, such as triphenylmethane-4,4',4"-triisocyanate, 1,3,5-triisocyanatobenzene, and 2,4,6-triisocyanatotoluene; and aromatic tetraisocyanates, such as 4,4'-diphenylmethane-2,2',5,5'-tetraisocyanate.

Examples of polyisocyanate derivatives include dimers, trimers, biurets, allophanates, urethodiones, urethoimines, isocyanurates, oxadiazinetriones, polymethylene polyphenyl polyisocyanates (crude MDI, polymeric MDI), or crude TDI of the polyisocyanates described above.

These polyisocyanates and derivatives thereof may be used singly, or in a combination of two or more.

Of the aliphatic diisocyanates, hexamethylene diisocyanate-based compounds are preferably used; and of the alicyclic diisocyanates, 4,4'-methylenebis(cyclohexyl isocyanate) is preferably used. Of these, in particular, derivatives of hexamethylene diisocyanate are most preferable, from the standpoint of, for example, adhesion and compatibility.

The polyisocyanate compound for use may also be a prepolymer that is formed by reacting the polyisocyanate or a derivative thereof with a compound having an active hydrogen group (e.g., a hydroxy or amino group), reactive with the polyisocyanate, in the present of an excessive amount of isocyanate groups. Examples of compounds reactive with the polyisocyanate include polyhydric alcohols, low-molecular-weight polyester resins, amines, and water.

The polyisocyanate compound for use may be a blocked polyisocyanate compound in which some or all of the isocyanate groups of the polyisocyanate or a derivative thereof are blocked with a blocking agent.

Examples of blocking agents include phenols, such as phenol, cresol, xylenol, nitrophenol, ethylphenol, hydroxydiphenyl, butylphenol, isopropylphenol, nonylphenol, octylphenol, and methyl hydroxybenzoate; lactams, such as ε-caprolactam, δ-valerolactam, γ-butyrolactam, and β-propiolactam; aliphatic alcohols, such as methanol, ethanol, propyl alcohol, butyl alcohol, amyl alcohol, and lauryl alcohol; ethers, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohols, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oximes, such as formamide oxime, acetamide oxime, acetoxime, methyl ethyl ketoxime, diacetyl monoxime, benzophenone oxime, and cyclohexane oxime; active methylenes, such as dimethyl malonate, diethyl malonate, ethyl acetoacetate, methyl acetoacetate, and acetylacetone; mercaptans, such as butyl mercaptan, t-butyl mercaptan, hexyl mercaptan, t-dodecyl mercaptan, 2-mercaptobenzothiazole, thiophenol, methylthiophenol, and ethylthiophenol; acid amides, such as acetanilide, acetanisidide, acetotoluide, acrylamide, methacrylamide, amide acetate, amide stearate, and benzamide; imides, such as succinimide, phthalimide, and maleimide; amines, such as diphenylamine, phenylnaphthylamine, xylidine, N-phenylxylidine, carbazole, aniline, naphthylamine, butylamine, dibutylamine, and butylphenylamine; imidazoles, such as imidazole and 2-ethylimidazole; ureas, such as urea, thiourea, ethylene urea, ethylenethiourea, and diphenylurea; carbamic acid esters, such as phenyl N-phenylcarbamate; imines, such as ethyleneimine and propyleneimine; sulfites, such as sodium bisulfite and potassium bisulfite; and azoles-based compounds. Examples of azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline.

Blocking (reacting a blocking agent) can be performed by optionally adding a solvent. The solvent for use in blocking reaction is preferably not reactive with isocyanate groups. Examples include ketones, such as acetone and methyl ethyl ketone; esters, such as ethyl acetate; and N-methyl-2-pyrrolidone (NMP).

The polyisocyanate compounds may be used singly, or in a combination of two or more.

When the clear paint (Z) for use is a two-component clear paint containing a hydroxy-containing resin and a polyisocyanate compound, the equivalent ratio of the isocyanate groups in the polyisocyanate compound to the hydroxyl groups in the hydroxy-containing resin (NCO/OH) is preferably 0.5 to 2.0, and more preferably 0.8 to 1.5, from the standpoint of, for example, curability and scratch resistance of the coating film.

The clear paint (z) may further optionally contain additives for paints, such as a curing catalyst, an antifoaming agent, an ultraviolet absorber, a rheology control agent, and an antisettling agent.

The clear paint (Z) may suitably contain a pigment, such as a color pigment, an effect pigment, and/or an extender pigment, in an amount within a range that does not impair transparency.

The color pigment may be a single pigment known for ink or paints, or a combination of two or more of such pigments.

The effect pigment for use may be a known pigment, in particular, an interference pigment.

The form of the clear paint (Z) is not particularly limited. The clear paint (Z) for use is typically an organic solvent-based paint composition. Examples of organic solvents for use in this case include various organic solvents for paints, such as aromatic or aliphatic hydrocarbon solvents, ester solvents, ketone solvents, and ether solvents. The organic solvent for use may be the solvent used in the preparation of, for example, the hydroxy-containing resin as is; or other organic solvents may be further added.

The clear paint (Z) has a solids concentration of preferably about 30 to 70 mass %, and more preferably about 40 to 60 mass %.

The clear paint (Z) is applied to the effect coating film. Coating of the clear paint (Z) is not particularly limited, and the clear paint (Z) can be applied by the same method as that for the base coat paint. For example, the clear paint (Z) can be applied by a coating method, such as air spray coating, airless spray coating, rotary-atomization coating, or curtain coating. In these coating methods, electrostatic charges may optionally be applied. Of these, rotary-atomization coating using electrostatic charges is preferable. Typically, the amount of the applied clear paint (Z) is preferably an amount that results in a cured film thickness of about 10 to 50 μm.

Moreover, when the clear paint (Z) is applied, it is preferable to suitably adjust the viscosity of the clear paint (Z) to fall within a viscosity range suitable for the coating method. For example, for rotary-atomization coating using electrostatic charges, it is preferable to suitably adjust the viscosity of the clear paint (Z) to fall within a range of about 15 to 60 seconds as measured with a Ford cup No. 4 viscometer at 20° C. using a solvent, such as an organic solvent.

After a clear coating film is formed by applying the clear paint (Z), preheating can be performed, for example, at a temperature of about 50 to 80° C. for about 3 to 10 minutes so as to facilitate the vaporization of volatile components.

The clear coating film may be a single layer, or two or more layers. When the clear coating film is formed of two or more layers, the same clear paint (Z) or different clear paints (Z) may be used for the first layer and the second layer. When different clear paints (Z) are used, it is preferable to use a clear paint (Z1) containing a hydroxy-containing acrylic resin and a melamine resin as the clear paint of the first layer, and to use a clear paint (Z2) containing a hydroxy-containing acrylic resin and a polyisocyanate compound as the clear paint of the second layer, from the standpoint of smoothness and adhesion of the obtained coating film.

Step (4)

Step (4) is to heat the uncured base coating film, the uncured effect coating film, and the uncured clear coating film formed in steps (1) to (3) to simultaneously cure these three coating films. Even if the effect pigment dispersion (Y) does not contain the crosslinking agent described above, the effect coating film may be cured due to the transition of the resin component from the upper layer and/or the lower layer.

Heating can be performed by a known technique, such as a hot-blast furnace, an electric furnace, or an infrared-guided heating furnace.

The heating temperature is preferably 70 to 150° C., and more preferably 80 to 140° C.

The heating time is not particularly limited, and is preferably 10 to 40 minutes, and more preferably 20 to 30 minutes.

Steps (1) to (4) described above are sequentially performed to form a multilayer coating film.

In the present invention, for example, a step of preheating a coating film, a step of setting the coating film (in which the coating film is left for a predetermined period of time to volatilize the solvent), and a step of sanding the coating film (polishing) may be suitably performed between the steps described above.

The obtained multilayer coating film has a lightness $L*15$ within the range of preferably 100 to 150, more preferably 100 to 145, and still more preferably 100 to 140, which is based on spectral reflectance of light illuminated at an angle of 45 degrees with respect to the multilayer coating film and received at an angle of 15 degrees deviated from specular reflection light; and a lightness $L*110$ within the range of preferably 50 to 90, more preferably 52 to 85, and still more preferably 55 to 80, which is based on spectral reflectance of light illuminated at an angle of 45 degrees with respect to the multilayer coating film and received at an angle of 110 degrees deviated from specular reflection light.

The $L*15$ and $L*110$ values in the present specification are defined as values determined from spectral reflectance measured with an MA-68II multi-angle spectrophotometer (trade name, produced by Videojet X-Rite K.K.). The $L*15$ value indicates a lightness in the highlight, and the $L*110$ value indicates a lightness in the bottom. A coating film whose $L*15$ value and $L*110$ value are both high exhibits a high lightness overall from the highlight to the bottom and white metallic luster.

Regarding graininess, the multilayer coating film obtained by the present invention preferably has an HG value of 5 to 50, more preferably 10 to 45, and still more preferably 15 to 40.

The HG value that indicates graininess is an abbreviation for a hi-light graininess value. The HG value is one of the scales for microscopic brilliance, which is a microscopically observed texture, and is a parameter that indicates the graininess in the highlight (observation of the coating film from near the specular reflection light against incident light). The HG value is calculated as follows. First, the coating film is photographed with a CCD camera at an incidence angle of 15° and a receiving angle of 0°, and the obtained digital image data (i.e., two-dimensional luminance distribution data) is subjected to a two-dimensional Fourier transform to obtain a power spectrum image. Subsequently, only the spatial frequency domain that corresponds to graininess is extracted from the power spectrum image, and the obtained measurement parameter is converted to a value from 0 to 100 that has a linear relation with graininess.

The multilayer coating film obtained by the present invention preferably has a specular gloss (60 degrees) of 80 to 180, more preferably 85 to 150, and still more preferably 90 to 140.

The specular gloss refers to a ratio of specular reflection from the surface of an object to specular reflection light from a reference surface (glass with a refractive index of 1.567), and is a value defined by JIS-Z8741. Specifically, specular gloss is determined in the following manner: a luminous flux of a predetermined aperture angle is allowed to enter the surface of a measurement sample at a predetermined incident angle, and a luminous flux of a predetermined aperture angle reflected in the direction of specular reflection is measured with an optical receiver; i.e., specular gloss is a value measured with a "glossmeter." In the present specification, the specular gloss is defined as a 60-degree specular gloss (60° degrees) measured with a glossmeter (micro-TRI-gloss, produced by BYK-Gardner).

The present invention also includes the following subject matter.

Item 1. A method for forming a multilayer coating film comprising the following steps (1) to (4):

(1) applying a base paint (X) to a substrate to form a base coating film, (2) applying an effect pigment dispersion (Y) to the base coating film formed in step (1) to form an effect coating film with a thickness of 0.01 to 5 μm as a dry film thickness, (3) applying a clear paint (Z) to the effect coating film formed in step (2) to form a clear coating film, and (4) heating the uncured base coating film, the uncured effect coating film, and the uncured clear coating film formed in steps (1) to (3) to simultaneously cure these three coating films;

wherein the effect pigment dispersion (Y) contains an aluminum flake pigment (A), light-scattering particles (B), a hydroxy-containing acrylic resin (C), and water.

Item 2. The method for forming a multilayer coating film according to Item 1, wherein the aluminum flake pigment (A) is a vapor-deposition aluminum flake pigment.

Item 3. The method for forming a multilayer coating film according to Item 1 or 2, wherein the light-scattering particles (B) are at least one member selected from the group consisting of titanium oxide, mica, silica, baryta, and glass.

Item 4. The method for forming a multilayer coating film according to Item 1 or 2, wherein the light-scattering particles (B) contain titanium oxide.

Item 5. The method for forming a multilayer coating film according to any one of Items 1 to 4, wherein the effect pigment dispersion (Y) further contains a surface adjusting agent (D).

Item 6. The method for forming a multilayer coating film according to any one of Items 1 to 5, wherein the effect pigment dispersion (Y) further contains a rheology control agent (E).

Item 7. The method for forming a multilayer coating film according to any one of Items 1 to 6, wherein the solids content of the effect pigment dispersion (Y) at the time the effect pigment dispersion (Y) is applied is adjusted to 0.1 to 25.0 mass %.

Item 8. The method for forming a multilayer coating film according to any one of Items 1 to 7, wherein the clear paint (Z) is a two-component clear paint that contains a hydroxy-containing resin and a polyisocyanate compound.

Item 9. The method for forming a multilayer coating film according to any one of Items 1 to 8, wherein
the lightness L*15 is within the range of 100 to 150, the lightness L*15 being based on spectral reflectance of light illuminated at an angle of 45 degrees with respect to the obtained multilayer coating film and received at an angle of 15 degrees deviated from specular reflection light; and
the lightness L*110 is within the range of 50 to 90, the lightness L*110 being based on spectral reflectance of light illuminated at an angle of 45 degrees with respect to the obtained multilayer coating film and received at an angle of 110 degrees deviated from specular reflection light.

Item 10. The method for forming a multilayer coating film according to any one of Items 1 to 9, wherein the content of the aluminum flake pigment (A) is 0.1 to 5.0 parts by mass, the content of the light-scattering particles (B) is 0.1 to 40.0 parts by mass, the content of the hydroxy-containing acrylic resin is 0.01 to 5.0 parts by mass, and the content of the water is 50 to 99.5 parts by mass in the effect pigment dispersion (Y), per 100 parts by mass of the total amount of the aluminum flake pigment (A), the light-scattering particles (B), the hydroxy-containing acrylic resin (C), and the water.

Item 11. The method for forming a multilayer coating film according to Item 5, wherein the content of the surface adjusting agent (D) in the effect pigment dispersion (Y) is 0.1 to 10.0 parts by mass as a solids content, per 100 parts by mass of the total amount of the aluminum flake pigment (A), the light-scattering particles (B), the hydroxy-containing acrylic resin (C), and the water.

Item 12. The method for forming a multilayer coating film according to Item 6, wherein the content of the rheology control agent (E) in the effect pigment dispersion (Y) is 0.01 to 5.0 parts by mass as a solids content, per 100 parts by mass of the total amount of the aluminum flake pigment (A), the light-scattering particles (B), the hydroxy-containing acrylic resin (C), and the water.

Item 13. A multilayer coating film comprising:
a base coating film formed from a base paint (X);
an effect coating film that is formed on the base coating film and that is formed from an effect pigment dispersion (Y),
the effect coating film comprising
an aluminum flake pigment (A),
light-scattering particles (B), and
a hydroxy-containing acrylic resin (C),
the effect coating film having a thickness of 0.01 to 5 µm as a dry film thickness; and
a clear coating film formed on the effect coating film by applying a clear paint (Z),
wherein the base coating film, the effect coating film, and the clear coating film are simultaneously cured.

Item 14. The multilayer coating film according to Item 13, wherein the aluminum flake pigment (A) is a vapor-deposition aluminum flake pigment.

Item 15. The multilayer coating film according to Item 13 or 14, wherein the light-scattering particles (B) are at least one member selected from the group consisting of titanium oxide, mica, silica, baryta, and glass.

Item 16. The multilayer coating film according to Item 13 or 14, wherein the light-scattering particles (B) contain titanium oxide.

Item 17. The multilayer coating film according to any one of Items 13 to 16, wherein the effect pigment dispersion (Y) further contains a surface adjusting agent (D).

Item 18. The multilayer coating film according to any one of Items 13 to 17, wherein the effect pigment dispersion (Y) further contains a rheology control agent (E).

Item 19. The multilayer coating film according to any one of Items 13 to 18, wherein the clear paint (Z) is a two-component clear paint that contains a hydroxy-containing resin and a polyisocyanate compound.

Item 20. The multilayer coating film according to any one of Items 13 to 19, wherein
the lightness L*15 is within the range of 100 to 150, the lightness L*15 being based on spectral reflectance of light illuminated at an angle of 45 degrees with respect to the obtained multilayer coating film and received at an angle of 15 degrees deviated from specular reflection light; and
the lightness L*110 is within the range of 50 to 90, the lightness L*110 being based on spectral reflectance of light illuminated at an angle of 45 degrees with respect to the obtained multilayer coating film and received at an angle of 110 degrees deviated from specular reflection light.

Item 21. The multilayer coating film according to any one of Items 13 to 20, wherein the content of the aluminum flake pigment (A) is 0.1 to 50.0 parts by mass, the content of the light-scattering particles (B) is 10.0 to 95.0 parts by mass, and the content of the hydroxy-containing acrylic resin is 0.1 to 30.0 parts by mass in the effect pigment dispersion (Y), per 100 parts by mass of the solids content of the effect pigment dispersion (Y).

Item 22. The multilayer coating film according to Item 17, wherein the content of the surface adjusting agent (D) in the effect pigment dispersion (Y) is 1 to 60 parts by mass per 100 parts by mass of the solids content of the effect pigment dispersion (Y).

Item 23. The multilayer coating film according to Item 18, wherein the content of the rheology control agent (E) in the effect pigment dispersion (Y) is 0.1 to 50 parts by mass per 100 parts by mass of the solids content of the effect pigment dispersion (Y).

EXAMPLES

The present invention is described in more detail below with reference to Examples and Comparative Examples. However, the present invention is not limited to only these Examples.

"Part(s)" and "%" are both based on mass.

Production of Hydroxy-Containing Acrylic Resin (C)

Production Example 1

35 parts of propylene glycol monopropyl ether was placed in a reaction vessel equipped with a thermometer, a thermostat, a stirrer, a reflux condenser, a nitrogen inlet tube, and a dropping funnel; and heated to 85° C. Subsequently, a mixture of 32 parts of methyl methacrylate, 27.7 parts of n-butyl acrylate, 20 parts of 2-ethylhexyl acrylate, 10 parts of 4-hydroxybutyl acrylate, 3 parts of hydroxypropyl acrylate, 6.3 parts of acrylic acid, 1 part of 2-acryloyloxyethyl acid phosphate, 15 parts of propylene glycol monopropyl ether, and 2.3 parts of 2,2'-azobis(2,4-dimethylvaleronitrile) was added dropwise thereto over a period of 4 hours. After completion of the dropwise addition, the mixture was aged for 1 hour. Subsequently, a mixture of 10 parts of propylene glycol monopropyl ether and 1 part of 2,2'-azobis(2,4-dimethylvaleronitrile) was further added dropwise thereto over a period of 1 hour. After completion of the dropwise addition, the mixture was aged for 1 hour. 7.4 parts of diethanolamine was further added thereto, thereby obtaining a hydroxy-containing acrylic resin (C-1) solution with a solids content of 55%. The obtained hydroxy-containing acrylic resin (C-1) had an acid value of 51 mg KOH/g, and a hydroxy value of 52 mg KOH/g.

Production Example 2

35 parts of propylene glycol monopropyl ether was placed in a reaction vessel equipped with a thermometer, a thermostat, a stirrer, a reflux condenser, a nitrogen inlet tube, and a dropping funnel; and heated to 85° C. Subsequently, a mixture of 30 parts of methyl methacrylate, 20 parts of 2-ethylhexyl acrylate, 29 parts of n-butyl acrylate, 15 parts of 2-hydroxyethyl acrylate, 6 parts of acrylic acid, 15 parts of propylene glycol monopropyl ether, and 2.3 parts of 2,2'-azobis (2,4-dimethylvaleronitrile) was added dropwise thereto over a period of 4 hours. After completion of the dropwise addition, the mixture was aged for 1 hour. Subsequently, a mixture of 10 parts of propylene glycol monopropyl ether and 1 part of 2,2'-azobis(2,4-dimethylvaleronitrile) was further added dropwise thereto over a period of 1 hour. After completion of the dropwise addition, the mixture was aged for 1 hour. 7.4 parts of diethanolamine was further added thereto, thereby obtaining a hydroxy-containing acrylic resin (C-2) solution with a solids content of 55%. The obtained hydroxy-containing acrylic resin (C-2) had an acid value of 47 mg KOH/g and a hydroxy value of 72 mg KOH/g.

Production Example 3

35 parts of propylene glycol monopropyl ether was placed in a reaction vessel equipped with a thermometer, a thermostat, a stirrer, a reflux condenser, a nitrogen inlet tube, and a dropping funnel; and heated to 85° C. Subsequently, a mixture of 30 parts of 2-acryloyloxyethyl acid phosphate, 20 parts of lauryl methacrylate, 10 parts of n-butyl acrylate, 20 parts of styrene, 10 parts of an ε-caprolactone adduct of 2-hydroxyethyl acrylate, 10 parts of 2-hydroxyethyl acrylate, 15 parts of propylene glycol monopropyl ether, and 2.3 parts of 2,2'-azobis (2,4-dimethylvaleronitrile) was added dropwise thereto over a period of 4 hours. After completion of the dropwise addition, the mixture was aged for 1 hour. Subsequently, a mixture of 10 parts of propylene glycol monopropyl ether and 1 part of 2,2'-azobis(2,4-dimethylvaleronitrile) was further added dropwise thereto over a period of 1 hour. After completion of the dropwise addition, the mixture was aged for 1 hour. 7.4 parts of diethanolamine was further added thereto, thereby obtaining a hydroxy-containing acrylic resin (C-3) solution with a solids content of 50%. The obtained hydroxy-containing acrylic resin (C-3) had an acid value of 140 mg KOH/g and a hydroxy value of 60 mg KOH/g.

Production of Titanium Oxide Dispersion

Production Example 4

6 parts (solids content: 3.3 parts) of the hydroxy-containing acrylic resin (C-1), 35 parts of JR-903 (tradename, a rutile-form titanium oxide pigment, produced by Tayca corporation), and 60 parts of deionized water were placed in a stirring vessel, and homogeneously mixed; followed by further adding 2-(dimethylamino) ethanol to adjust the pH to 7.5. The obtained mixture was placed in a 225-ml resin bottle, and 130 parts of zirconia beads (size: 1.5 mm) were added thereto; followed by hermetically sealing the bottle. The pigment was dispersed for 120 minutes with a shaking-type paint mixer. After dispersing the pigment, the zirconia beads were filtered through a 100-mesh metallic gauze and removed, thereby obtaining a titanium oxide dispersion 1 with a solids content of 66%.

Production Example 5

The procedure of Production Example 4 was repeated, except that the hydroxy-containing acrylic resin (C-1) was replaced with the hydroxy-containing acrylic resin (C-2), thereby obtaining a titanium oxide dispersion 2 with a solids content of 66%.

Production of Effect Pigment Dispersion (Y)

Production Example 6

92.0 parts of distilled water, 5.0 parts (0.5 parts as a solids content) of Hydroshine WS-3004 (trade name, a vapor-deposition aluminum flake pigment for use in aqueous solutions, produced by Eckart, solids content: 10%, internal solvent: isopropanol, average particle size D50: 13 μm, thickness: 0.05 μm, the surface was treated with silica), 2.9 parts (1.9 parts as a solids content) of the titanium oxide dispersion 1, 2.7 parts (0.76 parts as a solids content) of Acrysol ASE-60 (a polyacrylic acid-based rheology control agent, produced by The Dow Chemical Company, solids content: 28%), 1.0 part (1.0 part as a solids content) of a BYK348 surface adjusting agent (trade name, produced by BYK-Chemie, a silicone-based surface adjusting agent, contact angle: 130, dynamic surface tension: 63.9 mN/m, static surface tension: 22.2 mN/m, lamellar length: 7.45 mm, non-volatile content: 100 mass %), and 0.3 parts of dimethylethanolamine were mixed and stirred, thereby preparing an effect pigment dispersion (Y-1).

Production Examples 7 to 18

Effect pigment dispersions (Y-2) to (Y-13) were obtained in the same manner as in Production Example 6, except that the formulations shown in Table 1 were applied.

The details of the starting materials in the table are described below.

Aluminum Pigment (Note 1): Alpaste EMERAL EMR-B6360, trade name, non-leafing aluminum, produced by Toyo Aluminium K.K., average particle size D50: 10.3 μm, thickness: 0.19 μm, aluminum content: 47%, the surface is treated with silica.

Blocked Polyisocyanate (Note 2): a compound obtained by fully blocking the isocyanurates of hexamethylene diisocyanate with 3,5-dimethylpyrazole, solids content: 70%

Rheocrysta (Note 3): trade name, a cellulose-based rheology control agent=a cellulose nanofiber gel, produced by DKS Co. Ltd., solids content: 2%.

to stand for 3 minutes and then preheated at 80° C. for 3 minutes, thereby forming an effect coating film. Subsequently, a clear paint (Z-1), KINO6510, (trade name, produced by Kansai Paint Co., Ltd., a hydroxy/isocyanate curable acrylic-urethane resin-based two-component organic solvent-based paint) was applied to the effect coating film with a Robot Bell (produced by ABB) at a booth temperature of 23° C. and a humidity of 68% to form a coating film with a thickness of 35 μm on a dry film basis, thereby forming a clear coating film. After coating, the film was allowed to stand at room temperature for 7 minutes, and then heated in a hot-air-circulation drying oven at 140° C.

TABLE 1

The values in parentheses refer to a solids content.

| Production Example No. | 6 | 7 | 8 | 9 | 10 | 11 | 12 | 13 | 14 | 15 | 16 | 17 | 18 |
|---|---|---|---|---|---|---|---|---|---|---|---|---|---|
| Effect Pigment Dispersion | Y-1 | Y-2 | Y-3 | Y-4 | Y-5 | Y-6 | Y-7 | Y-8 | Y-9 | Y-10 | Y-11 | Y-12 | Y-13 |
| Distilled Water | 92.0 | 92.0 | 92.0 | 92.0 | 92.0 | 92.0 | 92.0 | 92.0 | 92.0 | 92.0 | 76.2 | 92.0 | 92.0 |
| Vapor-Deposition Aluminum Pigment | 5 (0.5) | 5 (0.5) | 5 (0.5) | 5 (0.5) | 10 (1.0) | 5 (0.5) | 5 (0.5) | 10 (1.0) | | | 5 (0.5) | 5 (0.5) | |
| Aluminum Pigment (Note 1) | | | | | | | | | 3.7 (1.7) | 3.7 (1.7) | | | |
| Titanium Oxide Dispersion 1 | 2.9 (1.9) | | 2.9 (1.9) | 2.9 (1.9) | 2.9 (1.9) | 5.8 (3.8) | 11.6 (7.7) | 5.8 (3.8) | 2.9 (1.9) | 2.9 (1.9) | 2.9 (1.9) | | 2.9 (1.9) |
| Titanium Oxide Dispersion 2 | | 2.9 (1.9) | | | | | | | | | | | |
| Hydroxy-Containing Acrylic Resin (C-3) | | | 0.7 (0.4) | 0.6 (0.3) | 0.8 (0.4) | 0.4 (0.2) | 0.4 (0.2) | 0.8 (0.4) | | | 1.5 (0.8) | | 0.4 (0.2) |
| Blocked Isocyanate (Note 2) | | | | 0.1 (0.08) | 0.2 (0.16) | 0.1 (0.08) | 0.1 (0.08) | 0.2 (0.16) | | | 0.4 (0.31) | | 0.1 (0.08) |
| Surface Adjusting Agent | 1.0 (1.0) | 1.0 (1.0) | 1.0 (1.0) | 1.0 (1.0) | 1.0 (1.0) | 1.0 (1.0) | 1.0 (1.0) | 1.0 (1.0) | 1.0 (1.0) | 1.0 (1.0) | 1.0 (1.0) | 1.0 (1.0) | 1.0 (1.0) |
| ASE-60 | 2.7 (0.76) | 2.7 (0.76) | 2.7 (0.76) | 2.7 (0.76) | 2.7 (0.76) | 2.7 (0.76) | 2.7 (0.76) | 2.7 (0.76) | 2.7 (0.76) | 2.7 (0.76) | | 2.7 (0.76) | 2.7 (0.76) |
| Rheocrysta (Note 3) | | | | | | | | | | | 18.8 (0.4) | | |
| Dimethylethanolamine | 0.3 | 0.3 | 0.4 | 0.4 | 0.4 | 0.4 | 0.4 | 0.4 | 0.4 | 0.5 | 0.3 | 0.3 | 0.3 |

Production of Substrate

Substrate 1

A cationic electrodeposition paint "Elecron GT-10" (trade name, produced by Kansai Paint Co., Ltd., an epoxy-resin-polyamine-based cationic resin containing a blocked polyisocyanate compound as a crosslinking agent) was applied by electrodeposition to a degreased and zinc phosphate-treated steel plate (JISG3141, size: 400 mm×300 mm×0.8 mm) to give a film thickness of 20 μm on a dry film basis. The resulting film was heated at 170° C. for 20 minutes, and cured by crosslinking to form an electrodeposition coating film, thereby obtaining a substrate 1.

Production of Test Plate

Example 1

A base paint (X-1), WP-580Z N-9.0, (trade name, produced by Kansai Paint Co., Ltd., a polyester resin-based aqueous intermediate paint, the L* value of the obtained coating film: 90) was electrostatically applied to the substrate 1 to give a cured film thickness of 20 μm with a rotary-atomization bell-shaped coater, and the resulting film was allowed to stand for 3 minutes to form a base coating film. Further, the effect pigment dispersion (Y-1) prepared as described above was applied to the base coating film with a Robot Bell (produced by ABB) at a booth temperature of 23° C. and a humidity of 68% to form a coating film with a thickness of 0.2 μm on a dry film basis. The film was allowed for 30 minutes to simultaneously dry the multilayer coating film, thereby preparing a test plate.

The film thickness of the dry coating film shown in Table 2 was calculated from the following formula. The same applies to the following Examples.

$$x = sc/sg/S * 10000$$

x: film thickness [μm]
sc: application solids content [g]
sg: specific gravity of coating film [g/cm$^3$]
S: area of evaluated application solids content [cm$^2$]

Examples 2 to 15 and Comparative Examples 1 and 2

Test plates were obtained in the same manner as in Example 1, except that the paint and film thickness shown in Table 2 were applied.

The base paints (X-2) and (X-3) in the table are as follows.

(X-2): WP-522H N-8.0 (trade name, produced by Kansai Paint Co., Ltd., a polyester resin-based aqueous intermediate paint, the L* value of the obtained coating film: 80).

(X-3): WP-522H N-7.0 (trade name, produced by Kansai Paint Co., Ltd., a polyester resin-based aqueous intermediate paint, the L* value of the obtained coating film: 70).

TABLE 2

|  | Examples | | | | | | | | | | | | | | | Comparative Examples | |
| --- | --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 | 14 | 15 | 1 | 2 |
| Type of Base Paint | X-1 | X-1 | X-1 | X-1 | X-1 | X-1 | X-1 | X-1 | X-1 | X-1 | X-1 | X-2 | X-3 | X-1 | X-1 | X-1 | X-1 |
| Lightness of Base Paint | L90 | L90 | L90 | L90 | L90 | L90 | L90 | L90 | L90 | L90 | L90 | L80 | L70 | L90 | L90 | L90 | L90 |
| Type of Effect Pigment Dispersion | Y-1 | Y-2 | Y-3 | Y-4 | Y-5 | Y-6 | Y-7 | Y-8 | Y-9 | Y-10 | Y-11 | Y-4 | Y-4 | Y-4 | Y-4 | Y-12 | Y-13 |
| Film Thickness (μm) | 0.2 | 0.2 | 0.2 | 0.2 | 0.2 | 0.2 | 0.2 | 0.2 | 0.2 | 0.7 | 0.7 | 0.2 | 0.2 | 0.4 | 0.7 | 0.2 | 0.2 |
| Type of Clear Paint | Z-1 | Z-1 | Z-1 | Z-1 | Z-1 | Z-1 | Z-1 | Z-1 | Z-1 | Z-1 | Z-1 | Z-1 | Z-1 | Z-1 | Z-1 | Z-1 | Z-1 |
| L*15 | 113 | 113 | 112 | 111 | 114 | 108 | 105 | 112 | 105 | 104 | 102 | 111 | 109 | 117 | 119 | 110 | 90 |
| L*110 | 68 | 69 | 70 | 71 | 65 | 73 | 78 | 71 | 72 | 73 | 73 | 62 | 60 | 62 | 60 | 57 | 90 |
| 60 Degrees | 107 | 106 | 109 | 103 | 115 | 102 | 100 | 103 | 97 | 96 | 110 | 102 | 101 | 102 | 100 | 166 | 92 |
| Waterproof Adhesion | 3 | 3 | 4 | 5 | 3 | 5 | 5 | 5 | 3 | 5 | 3 | 5 | 5 | 4 | 3 | 1 | 5 |
| HG | 24 | 24 | 25 | 26 | 28 | 22 | 20 | 25 | 37 | 39 | 21 | 24 | 22 | 24 | 22 | 27 | — |

Evaluation of Coating Film

The coating film of each test plate obtained in the above manner was evaluated. Table 2 shows the results.

L*15 Value and L*110 Value

The L*15 and L*110 values used here were calculated from the spectral reflectance measured with an MA-68II multi-angle spectrophotometer (trade name, produced by X-Rite, Inc.).

Specular Gloss (60 Degrees)

The 60-degree specular gloss of the test plates obtained above was measured with a glossmeter (micro-TRI-gloss, produced by BYK-Gardner).

HG Value

The HG value is an abbreviation of "hi-Light Graininess Value." The HG value is one of the scales for microscopic brilliance of a microscopically observed coating film surface, and is an index that indicates the graininess in the highlight. The HG value is calculated as follows. First, the coating surface is photographed with a CCD camera at a light incidence angle of 150 and a receiving angle of 0°, and the obtained digital image data (two-dimensional luminance distribution data) is subjected to a two-dimensional Fourier transform to obtain a power spectrum image. Subsequently, only the spatial frequency domain that corresponds to graininess is extracted from this power spectrum image; and the obtained measurement parameter is converted to a numerical value from 0 to 100 that has a linear relation with graininess, thus obtaining an HG value. An HG value of 0 indicates no graininess of the effect pigment at all, and an HG value of 100 indicates the highest possible graininess of the effect pigment.

Because Comparative Example 2 contained no aluminum flake pigment (A), the HG value could not be measured.

Waterproof Adhesion

The test plates were immersed in warm water at 40° C. for 240 hours, and then pulled out. Water droplets and dirt were wiped away with a cloth, and cross-cuts that reached the substrate of the test plates were made to form a grid of 100 squares (2 mm×2 mm) on the multilayer coating films of the plates with a utility knife at a room temperature of 23° C. within 10 minutes. Subsequently, an adhesive cellophane tape was applied to the surface of the grid portion, and then abruptly peeled off. The condition of the remaining grid-formed coating films was examined, and water resistance was evaluated in accordance with the following criteria. A rating of 3 or higher is considered "Pass."

5: 100 squares of the grid of the coating film remained, and no edge-peeling occurred at the edge of a cut made by the knife.

4: 100 squares of the grid of the coating film remained, but slight edge-peeling occurred at the edge of a cut made by the knife.

3: 100 squares of the grid of the coating film remained, but less than half per square of the grid of the coating film was peeled.

2: The number of remaining squares of the grid of the coating film was 90 to 99.

1: The number of remaining squares of the grid of the coating film was 89 or less.

The embodiments and Examples of the present invention are described in detail above. However, the present invention is not limited to the embodiments, and various modifications can be made based on the technical idea of the present invention.

For example, the structures, methods, steps, forms, materials, numerical values, and the like used in the embodiments and Examples are merely examples; and different structures, methods, steps, forms, materials, numerical values, and the like can also be used, if necessary.

Moreover, the structures, methods, steps, forms, materials, numerical values, and the like in the embodiments can be combined with each other, as long as these combinations do not deviate from the spirit and principal concept of the present invention.

The invention claimed is:

1. A method for forming a multilayer coating film comprising the following steps (1) to (4):
   (1) applying a base paint (X) to a substrate to form a base coating film, wherein a lightness L* value in an L*a*b* color space of the base coating film, based on light that is illuminated at an angle of 45 degrees with respect to the base coating film and that is received at an angle of 45 degrees deviated from the specular reflection light, is 60 to 99,
   (2) applying an effect pigment dispersion (Y) to the base coating film formed in step (1) to form an effect coating film with a thickness of 0.01 to 5 μm as a dry film thickness,
   (3) applying a clear paint (Z) to the effect coating film formed in step (2) to form a clear coating film, and
   (4) heating the uncured base coating film, the uncured effect coating film, and the uncured clear coating film formed in steps (1) to (3) to simultaneously cure these three coating films;
   wherein the effect pigment dispersion (Y) contains an aluminum flake pigment (A), light-scattering particles (B), a hydroxy-containing acrylic resin (C), and water.

2. The method for forming a multilayer coating film according to claim 1, wherein the aluminum flake pigment (A) is a vapor-deposition aluminum flake pigment.

3. The method for forming a multilayer coating film according to claim 1, wherein the light-scattering particles (B) are at least one member selected from the group consisting of titanium oxide, mica, silica, baryta, and glass.

4. The method for forming a multilayer coating film according to claim 1, wherein the effect pigment dispersion (Y) further contains a surface adjusting agent (D).

5. The method for forming a multilayer coating film according to claim 1, wherein the effect pigment dispersion (Y) further contains a rheology control agent (E).

6. The method for forming a multilayer coating film according to claim 1, wherein the solids content of the effect pigment dispersion (Y) at the time the effect pigment dispersion (Y) is applied is adjusted to 0.1 to 25.0 mass %.

7. The method for forming a multilayer coating film according to claim 1, wherein the clear paint (Z) is a two-component clear paint that contains a hydroxy-containing resin and a polyisocyanate compound.

8. The method for forming a multilayer coating film according to claim 1, wherein
the lightness $L^*15$ is within the range of 100 to 150, the lightness $L^*15$ being based on spectral reflectance of light illuminated at an angle of 45 degrees with respect to the obtained multilayer coating film and received at an angle of 15 degrees deviated from specular reflection light; and
the lightness $L^*110$ is within the range of 50 to 90, the lightness $L^*110$ being based on spectral reflectance of light illuminated at an angle of 45 degrees with respect to the obtained multilayer coating film and received at an angle of 110 degrees deviated from specular reflection light.

9. The method for forming a multilayer coating film according to claim 1, wherein the light-scattering particles (B) include titanium oxide.

* * * * *